United States Patent
Lin et al.

(10) Patent No.: US 8,812,286 B1
(45) Date of Patent: *Aug. 19, 2014

(54) EMULATION OF POWER SHUTOFF BEHAVIOR FOR INTEGRATED CIRCUITS

(71) Applicant: Cadence Design Systems, Inc., San Jose, CA (US)

(72) Inventors: Tsair-Chin Lin, Saratoga, CA (US); Bing Zhu, Fremont, CA (US); Platon Beletsky, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,583

(22) Filed: Jan. 8, 2013

Related U.S. Application Data

(63) Continuation of application No. 11/966,602, filed on Dec. 28, 2007, now Pat. No. 8,352,235.

(60) Provisional application No. 60/984,178, filed on Oct. 31, 2007.

(51) Int. Cl.
*G06G 7/54* (2006.01)
*G06F 17/50* (2006.01)

(52) U.S. Cl.
CPC ........ *G06F 17/5022* (2013.01); *G06F 17/5045* (2013.01); *G06F 2217/78* (2013.01); *G06F 2212/1028* (2013.01)
USPC .................... 703/18; 703/14; 703/23; 703/28

(58) Field of Classification Search
CPC ............ G06F 2217/78; G06F 17/5022; G06F 17/5045; G06F 1/3203; G06F 1/3237; G06F 1/324; G06F 2212/1028

USPC ........................... 703/14, 18, 23, 28; 716/133
See application file for complete search history.

(56) References Cited

U.S. PATENT DOCUMENTS

| | | | |
|---|---|---|---|
| 5,036,473 | A | 7/1991 | Butts et al. |
| 5,109,353 | A | 4/1992 | Sample et al. |
| 5,475,830 | A | 12/1995 | Chen et al. |
| 5,551,013 | A | 8/1996 | Beausoleil et al. |
| 5,960,191 | A | 9/1999 | Sample et al. |
| 6,035,117 | A | 3/2000 | Beausoleil et al. |
| 6,051,030 | A | 4/2000 | Beausoleil et al. |
| 6,901,565 | B2 | 5/2005 | Sokolov |
| 7,574,683 | B2 | 8/2009 | Wilson et al. |
| 7,735,030 | B1 | 6/2010 | Kalil et al. |
| 2002/0152060 | A1 | 10/2002 | Tseng |

(Continued)

OTHER PUBLICATIONS

"U.S. Appl. No. 11/966,602 , Response filed Feb. 21, 2012 to Non Final Office Action mailed Nov. 18, 2011", 13 pgs.

(Continued)

*Primary Examiner* — Kamini S Shah
*Assistant Examiner* — Aniss Chad
(74) *Attorney, Agent, or Firm* — Kenyon & Kenyon LLP

(57) ABSTRACT

A method for modeling power management in an integrated circuit (IC) includes: specifying a circuit design and a power architecture for the IC, the power architecture including a plurality of power domains for specifying power levels in different portions of the IC; determining an emulation module for the IC by including one or more hardware elements for modeling the power architecture in the emulation module; and using the emulation module to simulate changing power levels in one or more power domains of the IC including a power shutoff in at least one power domain.

22 Claims, 10 Drawing Sheets

(56) References Cited

U.S. PATENT DOCUMENTS

| | | |
|---|---|---|
| 2004/0172604 A1 | 9/2004 | Liu |
| 2006/0047493 A1 | 3/2006 | Gooding |
| 2006/0064293 A1 | 3/2006 | Kapoor et al. |
| 2006/0184905 A1 | 8/2006 | Floyd et al. |
| 2007/0245277 A1 | 10/2007 | Chen |
| 2008/0307240 A1 | 12/2008 | Dahan et al. |

OTHER PUBLICATIONS

"U.S. Appl. No. 11/966,602, Examiner Internview Summary mailed Feb. 23, 2012", 3 pgs.

"U.S. Appl. No. 11/966,602, Examiner Interview Summary mailed Aug. 24, 2012", 3 pgs.

"U.S. Appl. No. 11/966,602, Final Office Action mailed Mar. 1, 2011", 19 pgs.

"U.S. Appl. No. 11/966,602, Final Office Action mailed Apr. 23, 2012", 16 pgs.

"U.S. Appl. No. 11/966,602, Non Final Office Action mailed Nov. 18, 2011", 17 pgs.

"U.S. Appl. No. 11/966,602, Non-Final Office Action mailed Jul. 20, 2010", 15 pgs.

"U.S. Appl. No. 11/966,602, Notice of Allowance mailed Sep. 6, 2012", 9 pgs.

"U.S. Appl. No. 11/966,602, Response filed May 31, 2011 to Final Office Action mailed Mar. 1, 2011", 12 pgs.

"U.S. Appl. No. 11/966,602, Response filed Aug. 22, 2012 to Final Office Action mailed Apr. 23, 2012", 13 pgs.

"U.S. Appl. No. 11/966,602, Response filed Dec. 16, 2010 to Non Final Office Action mailed Jul. 20, 2010", 12 pgs.

Hsu, Chi-Ping, "Pushing Power Forward with a Common Power Format", EEtimes, (Nov. 5, 2006), 7 pgs.

Figure 9

| | Capacity overhead | Run time stop emulator | Run time force/set speed | Degree of randomization |
|---|---|---|---|---|
| Compile random decide | 50% or 100% FFs | No stop | No impact | poor |
| MUX adding & random set | 100% FFs | No stop | Run emulator force: slow | good |
| Run time PSO stop & random set | 0% FFs | Stop when PSO happens | Run emulator set: fast | good |
| Hybrid | 0% - 100% | Trade-off | Trade-off | Trade-off |

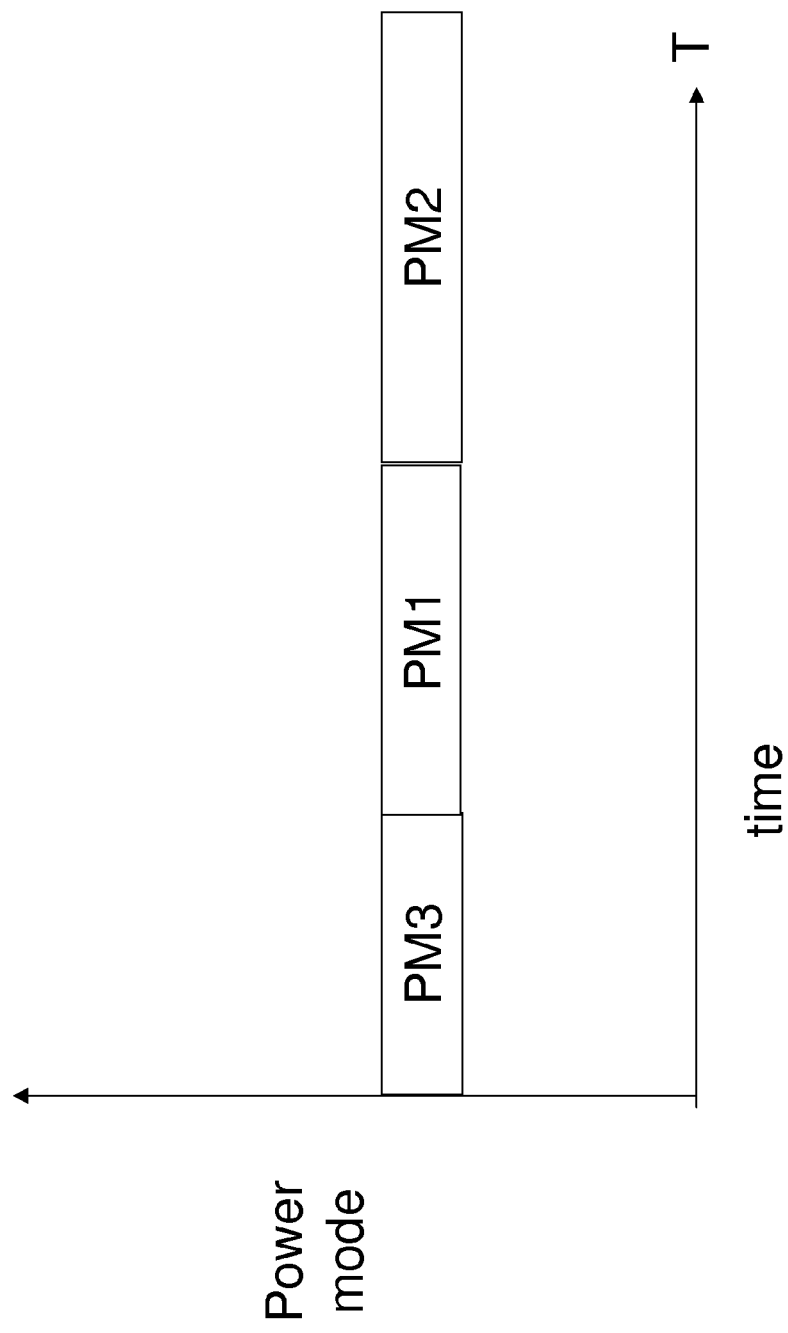

EMULATION OF POWER SHUTOFF BEHAVIOR FOR INTEGRATED CIRCUITS

CROSS-REFERENCE TO RELATED APPLICATIONS

This application is a continuation of and claims the benefit of priority under 35 U.S.C. §120 to U.S. patent application Ser. No. 11/966,602, filed on Dec. 28, 2007, now U.S. Pat. No. 8,352,235, which claims the benefit of U.S. Provisional Application No. 60/984,178 filed Oct. 31, 2007, and incorporated herein by reference.

BACKGROUND OF THE INVENTION

1. Field of Invention

The present invention relates generally to design verification systems for integrated circuits (ICs) and more particularly to the use of hardware-based functional verification systems for verifying power shutoff behavior of IC designs.

2. Description of Related Art

The development of EDA (electronic design automation) tools has included a number of hardware-based functional verification systems including logic emulation systems and simulation accelerators. For simplicity these tools will be referred to collectively as emulation systems in the subsequent discussion.

Emulation systems can be used to verify the functionalities of electronic circuit designs prior to fabrication as chips or as electronic systems. Typical emulation systems utilize either interconnected programmable logic chips or interconnected processor chips. Exemplary hardware logic emulation systems with programmable logic devices are described, for example, in U.S. Pat. Nos. 5,109,353, 5,036,473, 5,475,830 and 5,960,191, and exemplary hardware logic emulation systems with processor chips are described, for example, in U.S. Pat. Nos. 5,551,013, 6,035,117 and 6,051,030. Each of these patents is incorporated herein by reference in its entirety.

The DUT (Design Under Test) is usually provided in the form of either an RTL (Register Transfer Level) description or a gate level netlist. The gate level netlist may have been derived from RTL sources, including from a hardware description language (HDL), such as Verilog or VHDL (VHSIC (Very High Speed Integrated Circuit) HDL), using a synthesis method. Both RTL and gate level netlists are descriptions of the circuit's components and electrical interconnections between the components, where these components include all circuit elements, such as combinatory logic (e.g., gates) and sequential logic (e.g., flip-flops and latches), necessary for implementing a logic circuit.

Emulation systems have certain advantages over software simulation tools, which are conventionally used to create models of a user's design that can be simulated at a computer workstation, typically in a serial operations a single or a small number of CPUs (Central Processing Units). In contrast, hardware-based systems have dedicated hardware that will perform the designed functions in parallel. This massive parallelism enables a hardware-based system to operate at a speed that is orders of magnitude faster than a software simulator. Because emulators can operate so much faster than simulators, they can perform functional verification much faster. For example, an emulator can execute thousands of clock cycles of a DUT in a few milliseconds. Thus, in the same amount of time an emulator executes millions of clock cycles, a software simulator might only have simulated the execution of a few or even just a fraction of a clock cycle. In fact, emulators can operate at speed fast enough to allow the intended application software to run on the prototype system, which is something the software simulator can never accomplish.

Another advantage of hardware-based systems over simulation is their ability to operate "in circuit". Operating "in circuit" refers to an emulator's ability to operate in the actual hardware that the DUT being emulated will eventually be installed into once it has been fabricated. This actual hardware is sometimes referred to as the "target system". For example, the designer of a microprocessor might emulate the microprocessor design. Using a cable connecting the emulator to the motherboard of a personal computer, the emulator can be used in lieu of the actual microprocessor. The ability to operate in circuit provides many advantages. One of them is that the designer can see how their design functions in the actual system in which the DUT will eventually be installed. Another advantage is that in circuit emulation allows software development to take place before the IC chip is fabricated. Thus, the emulator can emulate the IC in the target system while the design team writes firmware and tests other application software.

Low-power designs for ICs (e.g., for applications in wireless and portable electronics) have led to additional challenges for design verification including minimizing leakage power dissipation, designing efficient packaging and cooling systems for high-power integrated circuits, and verifying functionalities of low-power or no power situations early in the design. These power management issues have become even more critical in view of the continuous shrinking of device dimensions with the next generation of semiconductor processing technology.

However, conventional emulation systems have not responded to these challenges. One reason is that existing power optimization and implementation techniques are typically applied at the physical implementation phase of the design process (e.g., after circuit synthesis). These power management design techniques may significantly change the design intent, yet none of the intended behavior can be captured in the RTL of the design. This deficiency creates a gap in the RTL to Graphic Data System II (GDSII) implementation and verification flow where the original RTL can no longer be relied upon as a correct representation of the design, and thus cannot be used to verify the final netlist implementation containing power management implementations.

One approach to power management for low power designs has been the development of a Common Power Format (CPF), which enables designers to specify design intents such as power management information in a single file that can be shared by different design tools in the entire design flow, all the way from RTL to GDSII implementation. Consistent power management analysis can be maintained across relevant design stages including verification, synthesis, testing, physical implementation and signoff analysis. (Chi-Ping Hsu, "Pushing Power Forward with a Common Power Format—The Process of Getting it Right," *EETimes*, 5 Nov. 2006.) However, conventional emulation systems have not incorporated these aspects so as to enable hardware-based verification of critical power management functions such as power shutoff, cell isolation and state retention in a low power design.

Thus there is a need for improved emulation systems for verifying power shutoff behavior of IC designs.

SUMMARY OF THE INVENTION

In one embodiment of the present invention, a method for modeling power management in an integrated circuit (IC)

includes: specifying a circuit design and a power architecture for the IC, the power architecture including a plurality of power domains for specifying power levels in different portions of the IC; determining an emulation module for the IC by including one or more hardware elements for modeling the power architecture in the emulation module; and using the power-management emulation module to simulate changing power levels in one or more power domains of the IC including a power shutoff in at least one power domain. The emulation module may include, for example, a netlist (e.g., IC logic) or some portion of a netlist that runs in an emulator. A hardware element may include, for example, an element of instrumentation logic that is added to the netlist.

According to one aspect of this embodiment, the emulation module may include at least one hardware element for modeling power levels in the power shutoff. According to another aspect, the emulation module may include at least one hardware element for modeling cell isolation in the power shutoff. According to another aspect, the emulation module may include at least one hardware element for modeling state retention in the power shutoff.

According to another aspect, determining the emulation module may include: using a randomizing value to select a power-switch hardware element that provides values for a sequential element output when using the emulation module. According to another aspect, determining the emulation module may include: selecting a multiplexer that receives a randomizing input and provides values for a sequential element in a power loss state when using the emulation module. According to another aspect, determining the emulation module may include: selecting a control element that receives power-switch signals for the power domains and adjusts values for a sequential element in a power loss state when using the emulation module.

According to another aspect, the method may further include: saving one or more values for the simulated power levels of the IC. According to another aspect, the method may further include: saving into a database selected values for IC primary inputs, IC primary outputs and sequential element outputs from using the emulation module; and using at least some values from the database to calculate power-management characteristics for a selected power domain. According to another aspect, the method may further include: associating emulation-module values with the power domains; calculating power-mode values for the simulated changing power levels of the IC from the emulation-values; and displaying the power mode values for the IC.

Additional embodiments relate to an apparatus for carrying out any one of the above-described methods, where the apparatus includes a computer for executing instructions related to the method. For example, the computer may include a processor with memory for executing at least some of the instructions. Additionally or alternatively the computer may include circuitry or other specialized hardware for executing at least some of the instructions. Additional embodiments also relate to a computer-readable medium that stores (e.g., tangibly embodies) a computer program for carrying out any one of the above-described methods with a computer. In these ways the present invention enables improved emulation systems for verifying power shutoff behavior of IC designs

BRIEF DESCRIPTION OF THE DRAWINGS

FIG. 9 shows a comparison of exemplary randomized power-switch elements according to embodiments of the present invention.

FIG. 10 shows an exemplary power mode profile for an embodiment of the present invention.

DETAILED DESCRIPTION OF EXEMPLARY EMBODIMENTS

Figure 1:
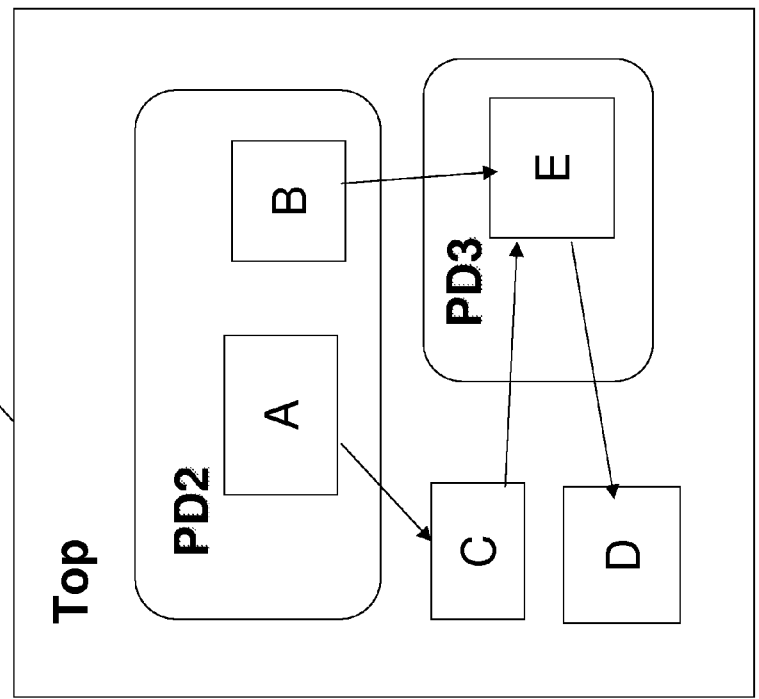
FIG. 1 shows an exemplary low power design for an IC in an embodiment of the present invention.

FIG. 1 shows an exemplary low-power design 102 for an IC in an embodiment of the present invention. The power design 102 includes a top cell instance "Top", which has sub-instances A, B, C, D and E. A corresponding CPF (Common Power Format) file indicates there are three power domains: PD1, PD2 and PD3. The instance C and D are in power domain PD1; instance A, B are in power domain PD2; instance E is in power domain PD3. Power management with power shutoff (PSO) is controlled by a power management module in instance C. There are three valid power modes: power mode PM1, PM2 and PM3. In power mode PM1, all three power domains are powered on, in power mode PM2 only power domain PD3 is off, and in power mode PM3 only power domain PD1 is powered on. Functional verification by an emulation system is directed towards verifying the design's PSO behavior in transitions between the power modes. As discussed below in greater detail, relevant PSO features include correct power modes, power off control, state retention, and cell isolation.

Figure 2:
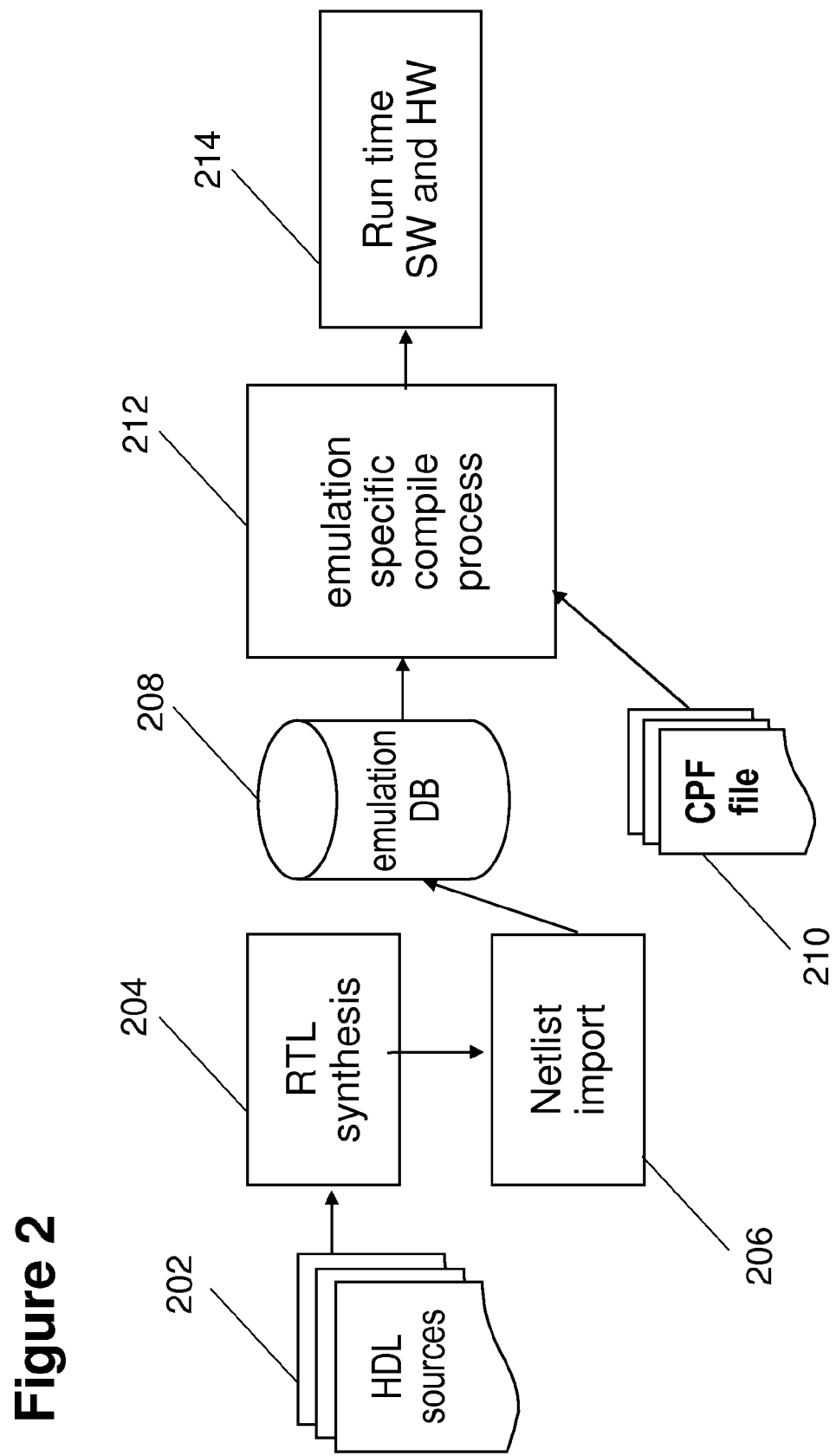
FIG. 2 shows a method for modeling an IC power architecture for an embodiment of the present invention.

FIG. 2 shows a method for modeling an IC low-power design for an embodiment of the present invention, including the basic flow of CPF processing in an emulation system (alternatively described as a simulation acceleration system). From HDL sources 202 an RTL synthesis 204 is carried out to produce a netlist 206 that can be imported into an emulation database (DB) 208. A CPF file 210, which specifies the corresponding power domains (e.g., as in FIG. 1), is combined with the netlist-derived emulation database 208 in an emulation-specific compile process 212 to enable runtime software and hardware for the emulation system 214. The CPF file 210 is read in a TCL (Tool Command Language) interpreter that controls the flow of the compile process 212 and the runtime process 214. During compilation 212, the netlist is first imported into the emulation DB 208, then the CPF file 210 is processed so that CPF information can be stored as system user data (e.g., for subsequent compilation 212 and execution 214). The incorporation of the CPF file 210 adds instrumentation logic based on the user's power management specification to the netlist, which is then translated into an executable image 212. During run time, the executable image is downloaded to an emulator 214 so that the design can be simulated for verification (e.g., based on probe signals, display waveform and power information at a specified time period or time point). As discussed below, instrumentation logic for power management may include logic for isolation, state-retention, and power switching.

Figure 3:
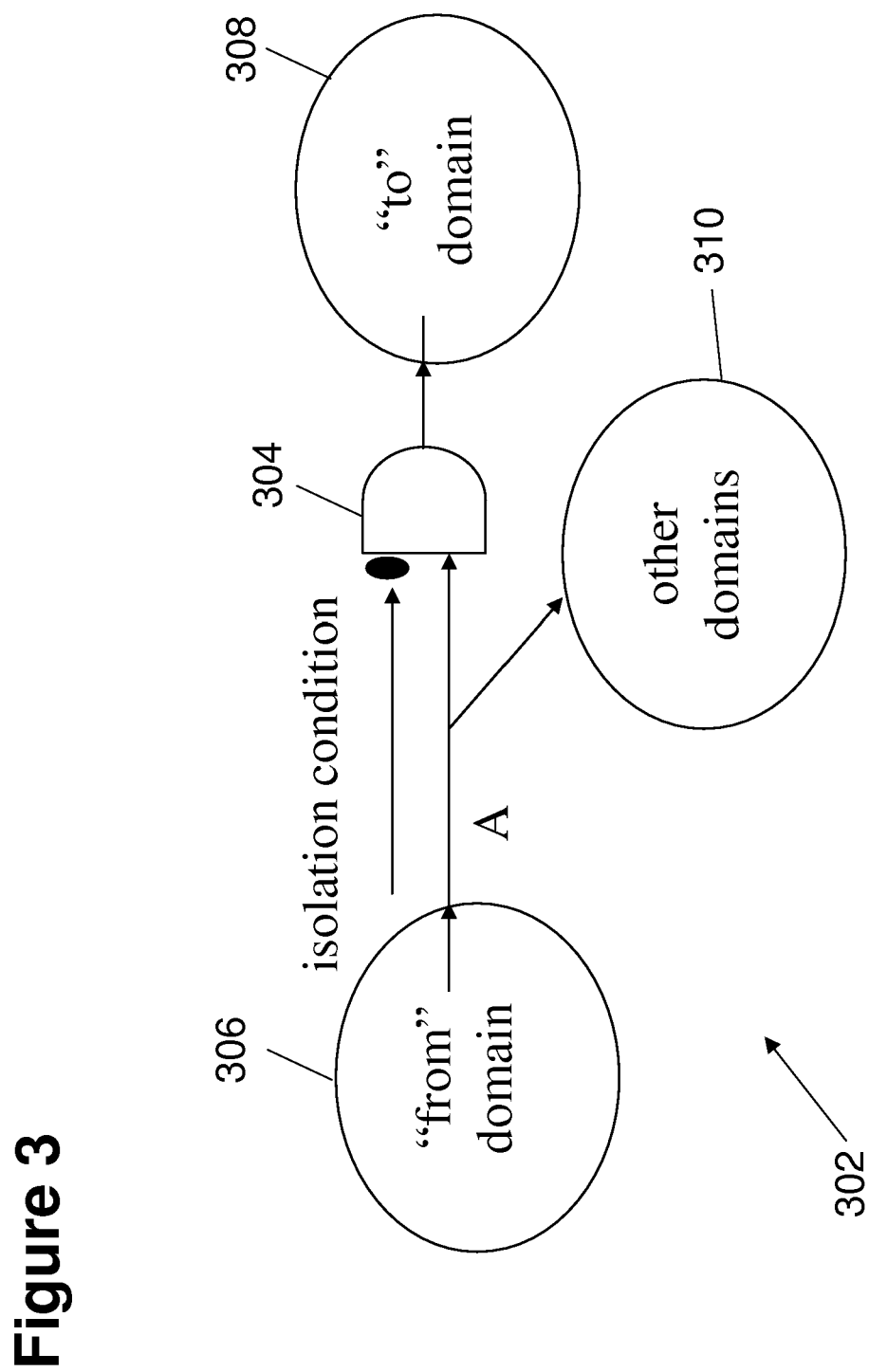
FIG. 3 shows an exemplary isolation element for an embodiment of the present invention.

Isolation is used for blocking signals from domains where the power has been turned off so that that values are not erroneously provided to other domains. FIG. 3 shows an exemplary isolation element 302 for an embodiment of the present invention. The instrumentation logic for isolation includes a logic gate 304 inserted between the source of signal A, denoted here as a "from" domain 306, and the potential destination, denoted here as a "to" domain 308. An isolation condition can be used to block signal A so that it does not reach the "to" domain 308 while allowing the signal to reach other domains 310. When the isolation value is "high", the gate 304 is an OR gate with the isolation condition and the output signal is "high", and when the isolation value is "low" gate 304 is an AND gate with the inversion of the isolation condition. When the isolation value is held at the "high" value, the gate 304 operates as a latch opened by the inversion of the isolation condition.

Figure 4:
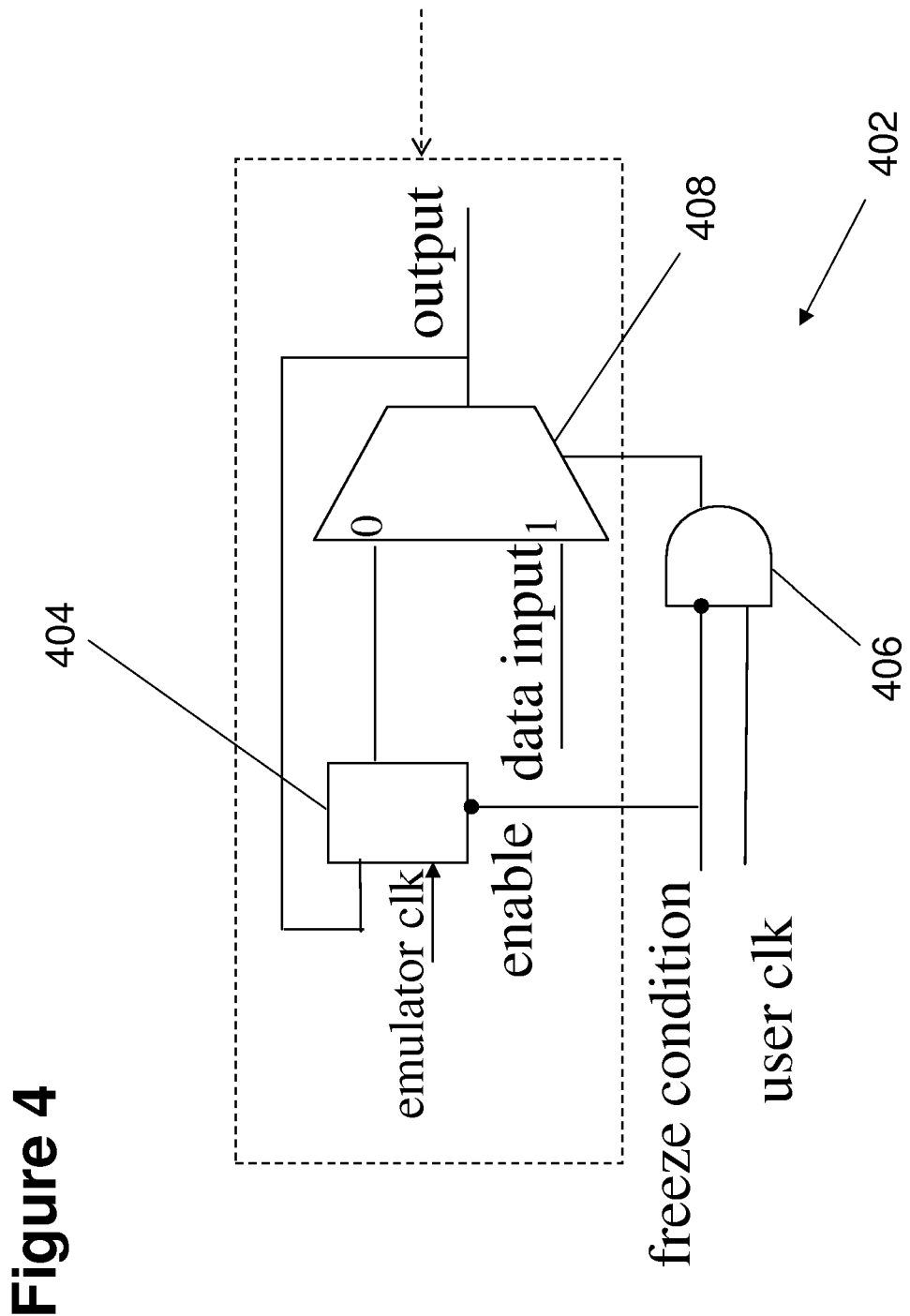
FIG. 4 shows an exemplary state-retention element for an embodiment of the present invention.

State-retention is used for saving values of sequential elements in a power domain where the power is being turned off so that the value can be restored when the power is turned on. FIG. 4 shows an exemplary state-retention element 402 for an embodiment of the present invention. The state retention element 402 includes a flip-flop or latch 404 in the emulation system (emulator clk is an internal emulator clock). An additional AND gate 406 at the user clock combined with a MUX (multiplexer) 408 allows one to freeze and release the domain state instantaneously (e.g., within one emulator clk cycle). In operation of this simple design, execution is not slowed down and glitches are not introduced.

Figure 5:
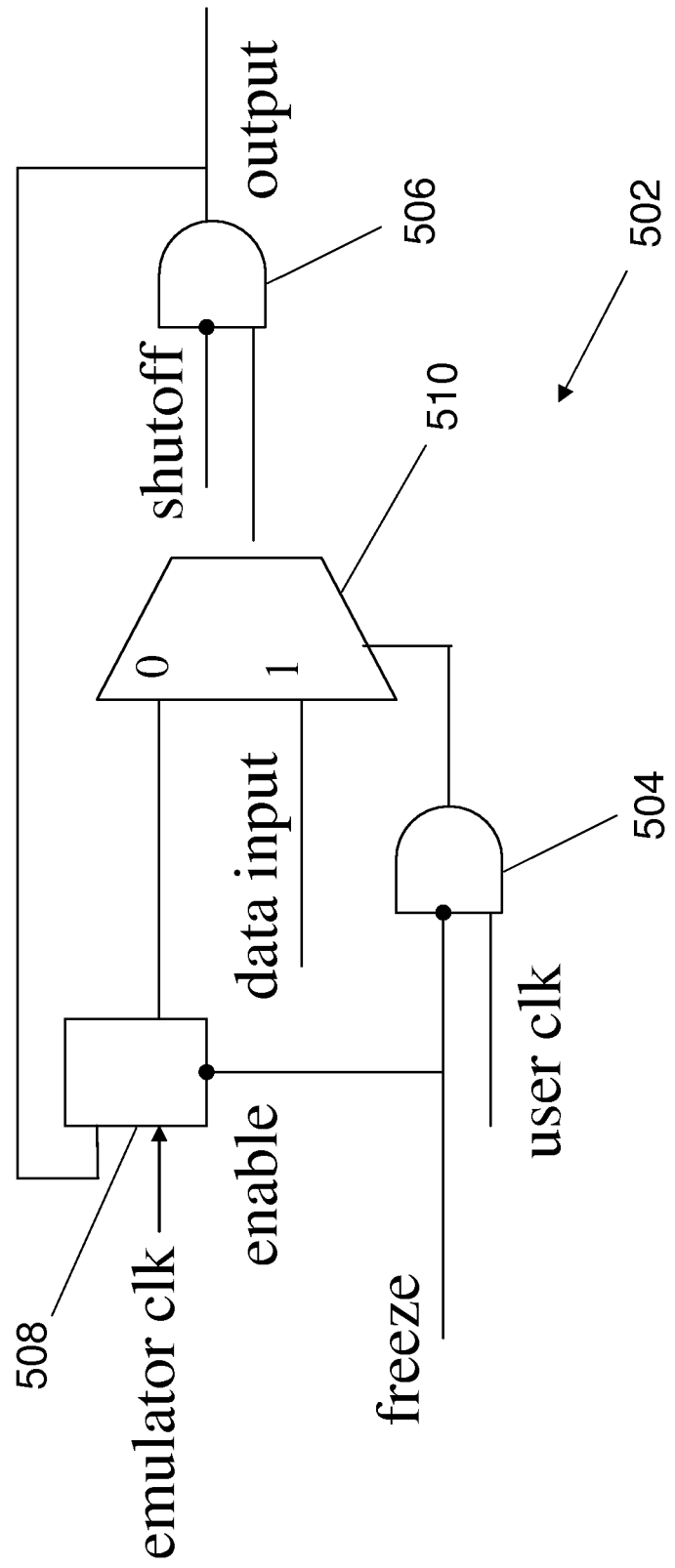
FIG. 5 shows an exemplary power-switch element for an embodiment of the present invention.

Power switching is used for switching between power-on and power-off (e.g., as in FIG. 1). FIG. 5 shows an exemplary power-switch element 502 for an embodiment of the present invention. The power switch element 502 includes an AND gate 502 for the shut off signal. Additional elements include an AND gate 504 for the state retention (freeze) signal, a flip-flop 508 associated with the emulator clock and a MUX 510 for combining signals.

In general, a power-switch element 502 and a state-retention element 402 should both appear in retained sequential logic (i.e., sequential logic where when state-retention is required). When the user does not require state-retention, a state-retention element 402 is not necessary although its presence will be acceptable since the freeze condition will be false. However a power switch element 502 should appear in both retained and non-retained sequential logic.

FIG. 5 shows an example of retained sequential logic with shutoff conditions. The shutoff condition provides a reset signal for this output, but the state is still retained because the emulator clk flip-flop 508 is disabled. This circuitry provides low value for non-retained registers. If non-retained value is high, an additional OR gate with a negedge on shutoff condition is needed. Random non-retained values can be provided by randomly inserting this OR gate during compile time instrumentation. As with other PSO operations, power off and power on is performed within one emulator clk cycle. This element 502 uses 0 as sequential element output value in emulator when this sequential element is in power loss state.

Figure 6:
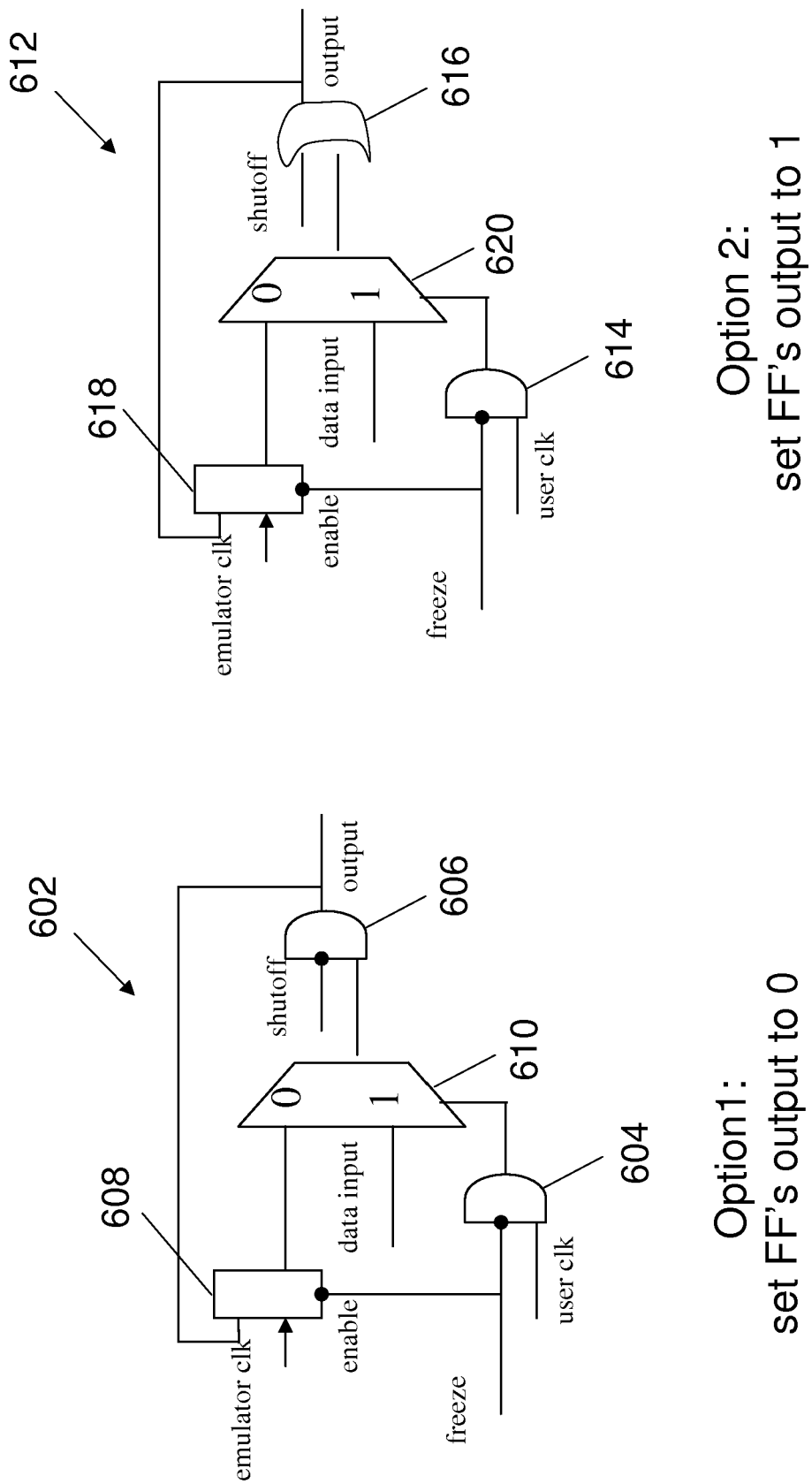
FIG. 6 shows two exemplary power-switch elements for an embodiment of the present invention with a randomized selection step.
Figure 7:
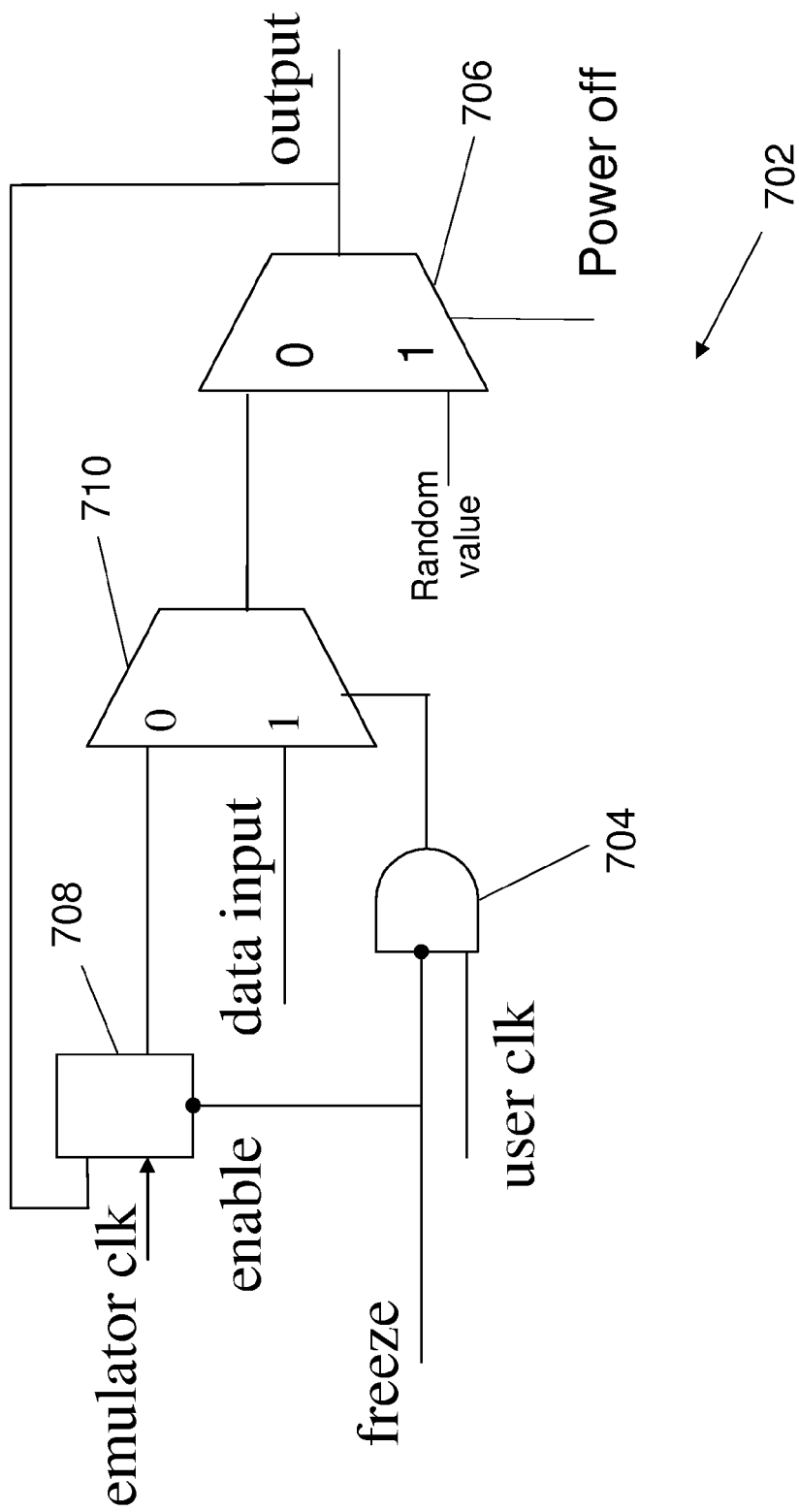
FIG. 7 shows another exemplary power-switch element with randomization for an embodiment of the present invention.
Figure 8:
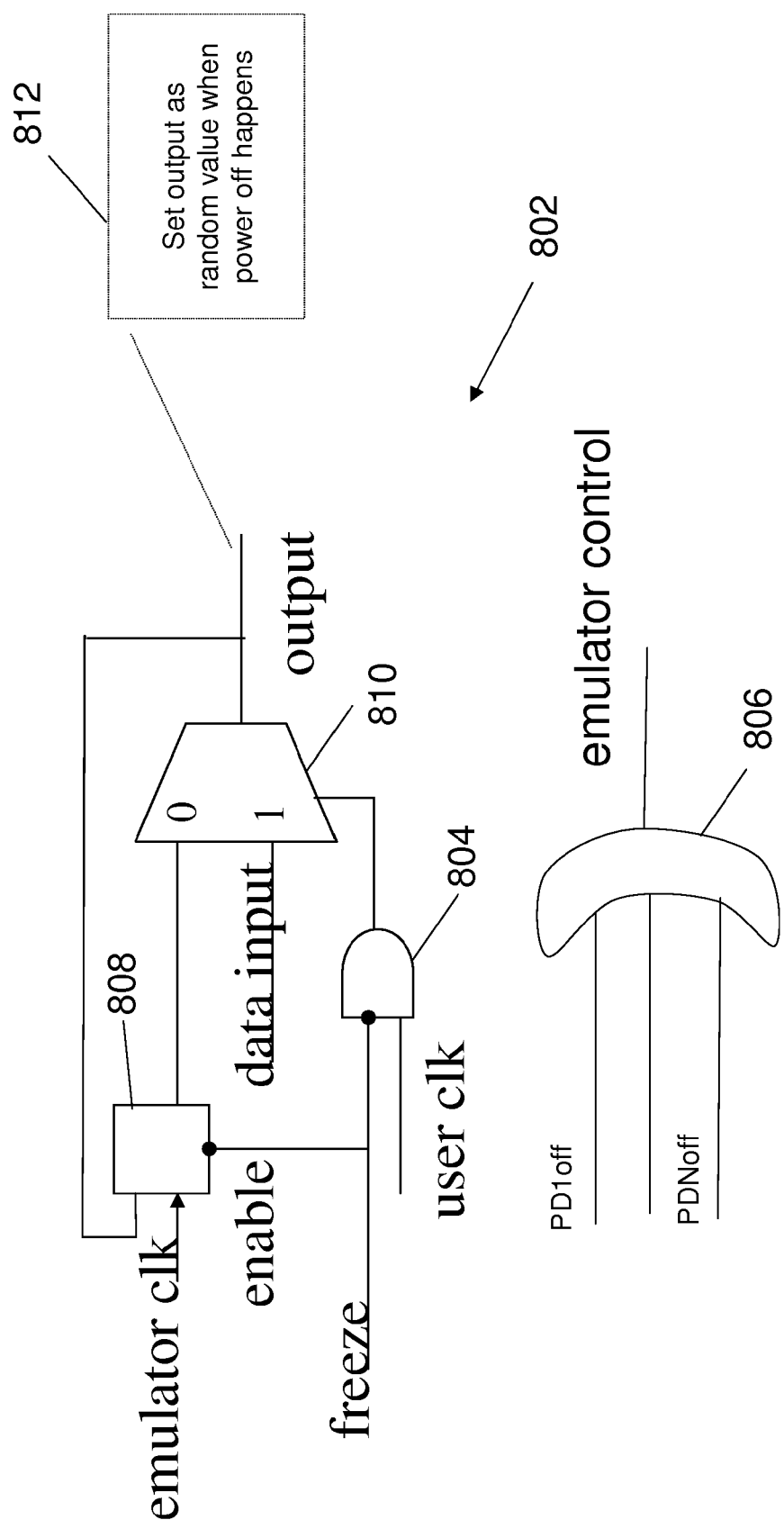
FIG. 8 shows another exemplary power-switch element with randomization for an embodiment of the present invention.

The exemplary power-switch elements in FIGS. 6-8 incorporate random values into the outputs of sequential elements in power-loss state (e.g., after switching from power-on to power-off).

FIG. 6 shows a dual-option embodiment where a randomizing value (e.g., from random number generator based on a linear recurrence formula) is used to randomize the sequential element output by selecting a different hardware element in the emulation system. The first option 602 sets the output to 0 as in FIG. 5 and includes an AND gate 604 for the state retention (freeze) signal, an AND gate 606 for the shutoff signal, a flip-flop 608 associated with the emulator clock, and a MUX 610 for combining signals. The second option 612 similarly includes an AND gate 614 for the state retention (freeze) signal, a flip-flop 618 associated with the emulator clock, and a MUX 620 for combining signals. But here the AND gate 606 for the shutoff signal has been replaced by an OR gate 616 in order to randomize the output.

FIG. 7 shows an embodiment of a power switch 702 that, similarly to FIG. 5, includes an AND gate 704 for the state retention (freeze) signal, a flip-flop 708 associated with the emulator clock and a MUX 710 for combining signals. But here the AND gate 506 for the shutoff signal has been replaced by an MUX 706 in order to randomize the output by means of an additional random input. The MUX 706 is enabled by the power-off condition so that a random value is used as the output. This random value can be produced in emulator by randomizing the value as 0 or 1 each time emulator is stopped or from time to time if emulator can not be stopped. Note that the random value input to the MUX 706 operates as a "force" condition so that the output does not change until the random value input changes.

FIG. 8 shows an embodiment of a power switch 802 that, similarly to FIG. 5, includes an AND gate 804 for the state retention (freeze) signal, a flip-flop 808 associated with the emulator clock and a MUX 810 for combining signals. But here the AND gate 506 for the shutoff signal has been replaced by a control module 806 that takes inputs based on which power domains are turned on or off and produces a control signal that is used to randomize the output 812. In this case the global emulator control logic 806, 812 will be added based on power domain off conditions, but no additional logic is inserted in the sequential elements. When a power domain switches to power-off, the emulator will stop, and the corresponding sequential element outputs can be randomly set to 0 or 1. The emulator stops under these conditions because the control module 806 is external to the emulator (e.g., not represented by logic in the emulator). In contrast to the previous embodiment, the randomization is carried out as a "set" condition since the control logic 806, 812 changes the output without maintaining a "force" condition.

FIG. 9 shows a comparison of exemplary power-switch elements with state retention. The first method 902 ("compile with random selection") corresponds to the dual-option based on a randomizing selection as illustrated in FIG. 6. The second method 904 ("MUX & random set") corresponds to a MUX based option as illustrated in FIG. 7. The third method 906 ("run time PSO stop & random set") corresponds to a control element driven by power-switch signals as illustrated in FIG. 8. The fourth method 908 ("Hybrid") reflects a range of options by combining features of the other methods. The columns illustrate qualitative comparisons between the approaches including capacity overhead 910 (e.g., additional flip flops (FFs)), whether the emulator stops at a PSO (Power ShutOff) condition 912, what the effect is on speed (e.g., from force/set conditions) 914 and the degree of randomization 916.

With respect to the capacity overhead 910, the third method 906 indicates the least capacity overhead and the second method 904 indicates the greatest capacity overhead since a MUX is added always. With respect to emulator stops at PSO 912, the third method 906 indicates that the emulator stops while the first method 902 and the second method 904 indicate that the emulator does not stop. With respect to run time force/set speed 914, the first method 902 indicates no impact, the second method 904 indicates "slow" and the third method 906 indicates "fast." With respect to the degree of randomization 916, the first method 902 indicates "poor" while the second method 904 and the third method 906 each indicate "good." As indicated by the fourth method 908, one can use a hybrid method to apply different methods to different power domains and get corresponding trade-offs depending on which method is applied.

Depending on the requirements of the operational setting, outputs can be displayed to show power mode or power domain activity over time. FIG. 10 shows an exemplary power mode profile for an embodiment of the present invention. During first time period the design is in power mode PM3, during second time period the design is in power mode PM1, during third time period the design is in power mode PM2. The profile show when the power mode transitions happen.

Although the representation in FIG. 10 shows just the power modes, related data for a waveform database may also be collected and displayed. In one embodiment of the present invention a method for data collection and display includes associating emulation-module values with the power domains; calculating power-mode values for the simulated changing power levels of the IC from the emulation-values; and displaying the power mode values for the IC. Alternatively or additionally waveform values corresponding to the relevant signals can also be collected during the simulation and displayed.

In general, the main work for generating a waveform database relates to how quickly we can locate all nets or pins in a power loss state. In one embodiment of the present invention we first identify the nets' ID ranges in an instance (e.g., during compilation). Secondly, we can build a map to associate a set of net ID ranges to the power domains. Third, run time software keeps net IDs in corresponding probe sets when users ask to put nets in the waveform database. Fourth, when generating a waveform, we use the map (e.g., sets of net ID ranges mapped to power domain) to group probes based on corresponding power domains, associate each power domain's internal power shutoff control signal and isolation value to each group. Fifth, write out 'x' or '0'/'1' with color coding in the waveform database for those probes whose corresponding power shutoff signals are on and not isolated. Otherwise, we use actual values observed by the emulator.

To display a given net or pin's value in given time, we first locate the power domain where the net/pin belongs, second check the power domain's internal power shutoff control signal, display the emulator value if shutoff control signal is off; display the emulator value if the shutoff control signal is on and the pin is isolated; display 'x' or '0'/'1' with "power loss" if the shutoff control signals is on and no isolation rule applies.

At least some values for the results of the above described methods can be output to a user or saved for subsequent use. For example the power mode values for given times can be saved directly for application as in power management verification. Power mode values and waveform values can be saved in a waveform database with a conventional format (e.g., SST2, FSDB databases). Alternatively, some derivative or summary form of the results can be saved for later use according to the requirements of the operational setting.

In some operational settings it may desirable to run the emulator and save selected values for simulating power shutoff behavior where these selected values may include IC primary inputs (e.g., pin values), IC primary outputs (e.g., pin values), and sequential element outputs (e.g., as in FIGS. 4-8). Then, in later analysis sessions, these values (or a subset) can be extracted from the database for analyzing related power-management characteristics that can be derived from the database values (e.g., power-mode or waveform details in a selected power domain). In this way, more detailed results from a relatively time consuming on-line mode of operation can be leveraged to provide targeted analysis results in an off-line mode when the emulator is not running.

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus may be configured as a system that includes one or more units, each of which is configured to carry out some aspects of the method either in software, in hardware or in some combination thereof. At least some values for the results of the method can be saved, either in memory (e.g., RAM (Random Access Memory)) or permanent storage (e.g., a hard-disk system) for later use.

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII).

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A method for modeling power management in an integrated circuit (IC) comprising:
   specifying a circuit design and a power architecture for the IC, the circuit design including a plurality of circuit elements included in the IC, and the power architecture including a plurality of power domains for specifying power levels in different portions of the IC;
   determining an emulation module for the IC by including one or more hardware elements for modeling the power architecture in the emulation module, the one or more hardware elements including a first hardware element that receives a signal-value input for a first circuit element of a first power domain of the IC and provides a signal-value output that corresponds to an output of the first circuit element, the first hardware element further receiving a power-shutoff control input for changing power levels in the first power domain between a power-on configuration and a power-off configuration, and the first hardware element further receiving a state-retention control input for saving a state-retention value corresponding to the signal-value output in the power-off configuration; and
   using the emulation module to simulate changing power levels in one or more power domains of the IC including a power shutoff in the first power domain, the first hardware element providing the signal-value input as the signal-value output in the power-on configuration, providing a power-shutoff value as the signal-value output in the power-off configuration, and in a switching operation from the power-off configuration to the power-on configuration providing the state-retention value as a restored value to the signal-value output before the signal-value input is provided as the signal-value output.

2. The method of claim 1, wherein the first hardware element includes a logic gate that receives the power-shutoff control input for changing the power levels in the first power domain in combination with an input corresponding to the signal-value input or the state-retention value.

3. The method of claim 1, wherein the emulation module includes at least one hardware element that receives an isolation control input for modeling cell isolation in the power-off configuration by blocking an isolated signal from a portion of the IC.

4. The method of claim 1, further comprising:
using a random-number generator to randomize the power-shutoff value.

5. The method of claim 1, wherein determining the emulation module includes:
using a random-number generator to determine a randomizing value; and
using the randomizing value to select a power-switch hardware element that receives a power switch input for power switching and provides one or more values that are correspondingly randomized for the power-shutoff value when using the emulation module.

6. The method of claim 1, wherein determining the emulation module includes:
using a random-number generator to determining a randomizing input; and
selecting a multiplexer that receives the randomizing input and provides correspondingly randomized values for the power-shutoff value when using the emulation module.

7. The method of claim 1, wherein determining the emulation module includes:
selecting a control element that receives power-switch signals for the power domains and adjusts values for the first hardware element in a power-loss state when using the emulation module.

8. The method of claim 1, further comprising:
saving one or more values for the simulated power levels of the IC.

9. The method of claim 1, further comprising:
saving into a database selected values for IC primary inputs, IC primary outputs and sequential element outputs from using the emulation module; and
using at least some values from the database to calculate power-management characteristics for a selected power domain.

10. The method of claim 1, further comprising:
associating emulation-module values with the power domains;
calculating power-mode values for the simulated changing power levels of the IC from the emulation-values; and
displaying the power mode values for the IC.

11. An apparatus for modeling power management in an integrated circuit (IC), the apparatus comprising a computer for executing computer instructions, wherein the computer includes computer instructions for:
specifying a circuit design and a power architecture for the IC, the circuit design including a plurality of circuit elements included in the IC, and the power architecture including a plurality of power domains for specifying power levels in different portions of the IC;
determining an emulation module for the IC by including one or more hardware elements for modeling the power architecture in the emulation module, the one or more hardware elements including a first hardware element that receives a signal-value input for a first circuit element of a first power domain of the IC and provides a signal-value output that corresponds to an output of the first circuit element, the first hardware element further receiving a power-shutoff control input for changing power levels in the first power domain between a power-on configuration and a power-off configuration, and the first hardware element further receiving a state-retention control input for saving a state-retention value corresponding to the signal-value output in the power-off configuration; and
using the emulation module to simulate changing power levels in one or more power domains of the IC including a power shutoff in the first power domain, the first hardware element providing the signal-value input as the signal-value output in the power-on configuration, providing a power-shutoff value as the signal-value output in the power-off configuration, and in a switching operation from the power-off configuration to the power-on configuration providing the state-retention value as a restored value to the signal-value output before the signal-value input is provided as the signal-value output.

12. The apparatus of claim 11, wherein the first hardware element includes a logic gate that receives the power-shutoff control input for changing the power levels in the first power domain in combination with an input corresponding to the signal-value input or the state-retention value.

13. The apparatus of claim 11, wherein the computer further includes computer instructions for:
using a random-number generator to randomize the power-shutoff value.

14. The apparatus of claim 11, wherein determining the emulation module includes:
using a random-number generator to determine a randomizing value; and
using the randomizing value to select a power-switch hardware element that receives a power-switch input for switching power and provides one or more values that are correspondingly randomized for the power-shutoff value when using the emulation module.

15. The apparatus of claim 11, wherein determining the emulation module includes:
using a random-number generator to determine a randomizing input; and
selecting a multiplexer that receives the randomizing input and provides correspondingly randomized values for the power-shutoff value when using the emulation module.

16. The apparatus of claim 11, wherein determining the emulation module includes:
selecting a control element that receives power-switch signals for the power domains and adjusts values for the first hardware element in a power-loss state when using the emulation module.

17. A non-transitory computer-readable medium that stores a computer program for modeling power management in an integrated circuit (IC), wherein the computer program includes instructions for:
specifying a circuit design and a power architecture for the IC, the circuit design including a plurality of circuit elements included in the IC, and the power architecture including a plurality of power domains for specifying power levels in different portions of the IC;

determining an emulation module for the IC by including one or more hardware elements for modeling the power architecture in the emulation module, the one or more hardware elements including a first hardware element that receives a signal-value input for a first circuit element of a first power domain of the IC and provides a signal-value output that corresponds to an output of the first circuit element, the first hardware element further receiving a power-shutoff control input for changing power levels in the first power domain between a power-on configuration and a power-off configuration, and the first hardware element further receiving a state-retention control input for saving a state-retention value corresponding to the signal-value output in the power-off configuration; and using the emulation module to simulate changing power levels in one or more power domains of the IC including a power shutoff in the first power domain, the first hardware element providing the signal-value input as the signal-value output in the power-on configuration, providing a power-shutoff value as the signal-value output in the power-off configuration, and in a switching operation from the power-off configuration to the power-on configuration providing the state-retention value as a restored value to the signal-value output before the signal-value input is provided as the signal-value output.

18. The non-transitory computer-readable medium of claim 17, wherein the first hardware element includes a logic gate that receives the power-shutoff control input for changing the power levels in the first power domain in combination with an input corresponding to the signal-value input or the state-retention value.

19. The non-transitory computer-readable medium of claim 17, wherein the computer program further includes instructions for:

using a random-number generator to randomize the power-shutoff value.

20. The non-transitory computer-readable medium of claim 17, wherein determining the emulation module includes:

using a random-number generator to determine a randomizing value; and using the randomizing value to select a power-switch hardware element that receives a power-switch input for switching power and provides one or more values that are correspondingly randomized for the power-shutoff value when using the emulation module.

21. The non-transitory computer-readable medium of claim 17, wherein determining the emulation module includes:

using a random-number generator to determine a randomizing input; and selecting a multiplexer that receives the randomizing input and provides correspondingly randomized values for the power-shutoff value when using the emulation module.

22. The non-transitory computer-readable medium of claim 17, wherein determining the emulation module includes:

selecting a control element that receives power-switch signals for the power domains and adjusts values for the first hardware element in a power-loss state when using the emulation module.

\* \* \* \* \*